Figure 1:
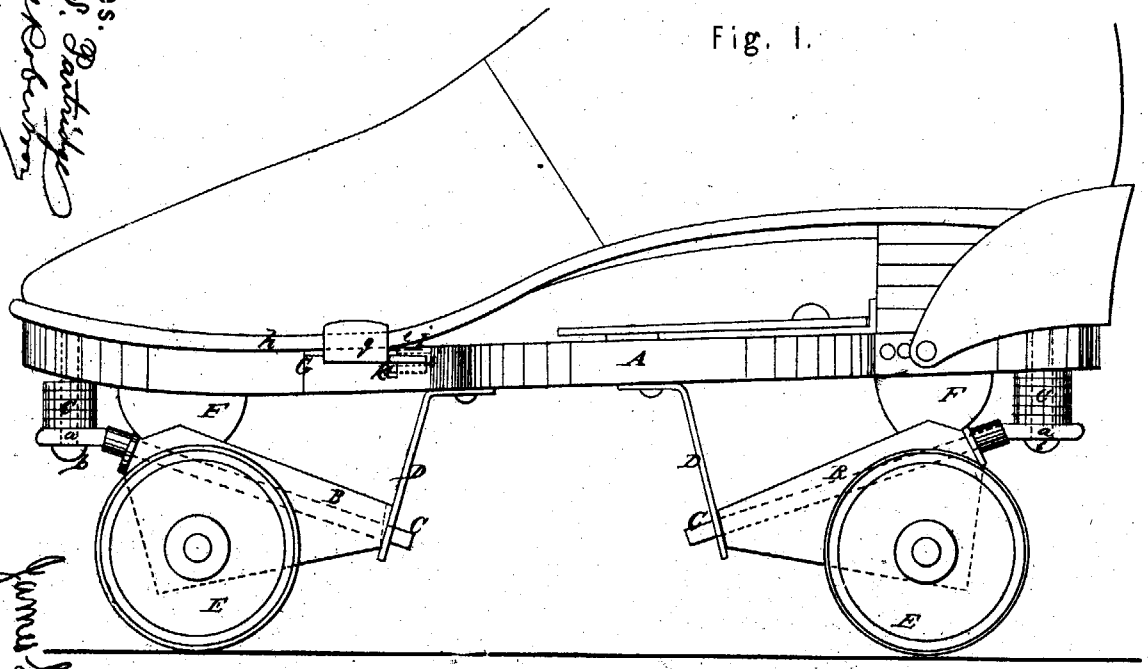

3 Sheets, Sheet 1.

James L. Plimpton

Skate.

No. 3,906. Reissued April 5 1870.

Witnesses.
M. S. Partridge
Paul Robertson

Inventor.
James L. Plimpton

3 Sheets. Sheet 2.

James L. Plimpton,

Skate.

No. 3,906. Reissued April 5, 1870.

Witnesses,
M. S. Partridge
Dan'l Robertson

Inventor.
James L. Plimpton

3 Sheets. Sheet 3.
James L. Plimpton,
Skate.
No. 3,906. Reissued April 5, 1870.
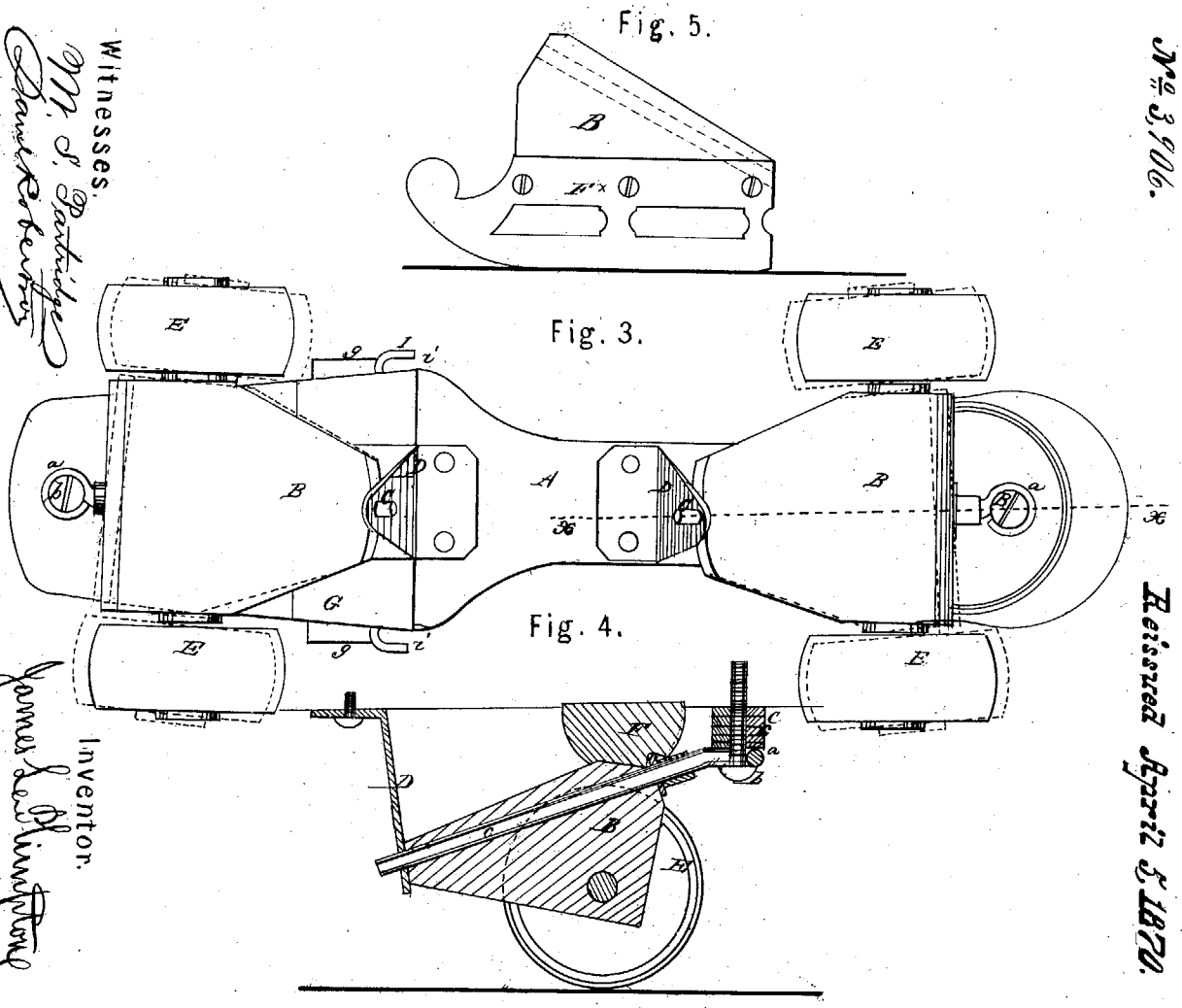
Witnesses.
M. S. Partridge
Dan'l Robertson
Inventor.
James L. Plimpton

UNITED STATES PATENT OFFICE

JAMES L. PLIMPTON, OF NEW YORK, N. Y

IMPROVEMENT IN SKATES.

Specification forming part of Letters Patent No. 37,305, dated January 6, 1863; reissue No. 3,906, dated April 5, 1870.

*To all whom it may concern:*

Be it known that I, JAMES L. PLIMPTON, of New York city, in the county and State of New York, have invented a new and useful Improvement in Skates; and I do hereby declare that the following is a full, clear, and exact description thereof, which will enable others skilled in the art to make and use the same, reference being had to the accompanying drawings, forming part of this specification.

This invention relates to a new construction of skate, and to a new manner of securing the rollers or runners to the sole or foot support of the same with an object of producing, by the transverse rocking motion of the said foot-support, the guiding of the skate in either direction—that is to say, the turning of the rollers or runners to the right or left to cause the skate to move in a circle. Another object of the invention is to retain the same broad base while turning as there is while moving the same in a straight direction; also to provide an adjustment of the hangers on which the rollers or runners are hung, so that a given inclination of the foot will produce a larger or smaller curve during motion.

The invention consists in so hanging or securing the rollers or runners to the foot support or sole that the rocking motion of the latter will cause the said rollers or runners to swing sidewise to run the skate in the line of a circle, and thereby to guide the same to either side. The invention consists also in so securing the hanger that its inclination can be adjusted, thereby regulating the horizontal swing of the rollers or runners to a greater or less curve with a greater inclination of the foot-support. For learners this adjustment will be very convenient, as the same skate answers for different degrees of proficiency of the skater. The invention consists, further, in providing springs or cushions in combination with the hangers, the said springs preventing the rattling of the skate, and tending to throw the foot-support back to a horizontal position, and the rollers or runners into the straight direction, whenever the weight is removed from one side of the foot-support. Finally, the invention consists in a novel arrangement of devices for fastening the foot-support, if a separate plate, to the boot or shoe of the skater, the said devices being, however, not necessarily connected with the other parts of my invention, nor with any other peculiar construction of skate.

Figure 2:
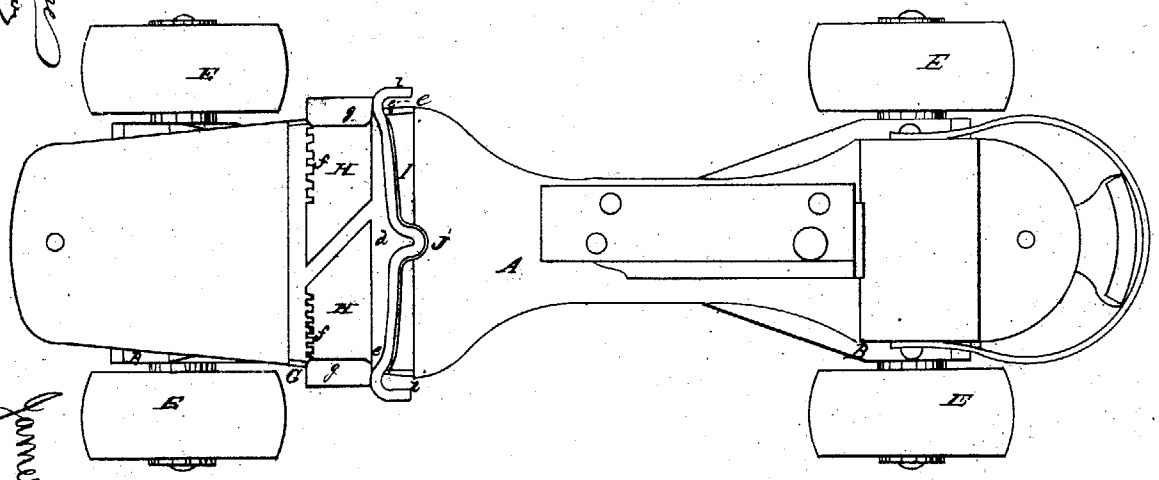

In the accompanying drawing, Figure 1 represents a side view of a skate having my improvements. Fig. 2 is a plan or top view of the same. Fig. 3 is an inverted plan view of the same. Fig. 4 is a detail longitudinal section of a portion of the same, the plane of section being indicated by the line *x x*, Fig. 3. Fig. 5 is a detail side view of one of the runners.

Similar letters of reference indicate corresponding parts.

A in the drawing represents the foot-support or sole of the skate.

To the under side of the foot-support are pivoted, by longitudinal inclined rods C C, two hangers or blocks, B B, of suitable shape. The rods C are fastened to the under side of the foot-support, near the ends of the same, in inclined positions, so that their inner ends are lower than the outer. They are held in place by ears or plates D projecting downward from the foot-support, and by screws or pins *b b* secured into said foot-supports. The pins *b* fit through eyes *a* formed at the upper ends of the rods C. Washers *c c* are interposed between the said eyes *a* and the foot-support. By increasing or decreasing the number or thickness of the said washers, or by changing their position upon the screws, the inclination of the rod C can be regulated. The screws *b* may, if desired, be at the lower and the ears D at the upper ends of the rods C.

E E are rollers hung on the sides of the hangers, one roller on each side of each hanger. F F are springs or cushions, interposed between the hangers and the foot-support or attachments thereof, said springs aiding to support the foot when the weight rests upon the stake, and also when the weight is removed, to bring the parts to place, and prevent the same from rattling or working too freely.

It will be seen that as the hangers are hung on an incline pivot, or its equivalent, which is rigidly connected with the foot-support, the rocking motion of the latter will carry the higher end of said pivot less far away from the center-line of the skate than the lower end of the same; and that, therefore, by the peculiar oblique position thus imparted to the pivot, the hangers will also be set obliquely to the center-line of the foot-support, without, however, changing its position vertically. The more the foot-support is canted, the more will the hanger be swung aside, and with it the rollers E on it. Thus the rocking motion of the foot-support will cause the rollers to be swung aside, in the manner indicated by red lines in Fig. 3, to run the skate in a curve. The diameter of such curve is made larger or smaller in accordance with the degree of transverse inclination given to the foot-support.

The aforementioned swinging motion imparted to the hanger by the rocking of the foot-support does, however, not affect the bearing of the rollers—that is to say, they remain with their full edges on the floor, to whatever degree they may be swung to the side. The full bearing is thus retained, the process of skating considerably facilitated. The inclination of the pivot C causes, as was shown above, the swinging of the hangers. The more the pivot is inclined the greater will consequently be the swing of the hangers at a certain inclination of the foot-support. The adjustment of the said pivot by means of the washers or their equivalents serves, therefore, to regulate the curve described by the skate at a given inclination of the foot-support.

In place of the rollers E, runners $F^{\times}$ may be attached to the sides of the hangers, their positions being regulated in the same manner as those of the rollers.

In the upper surface of the foot-support is or may be formed a transverse groove or recess, *d*, over which a metal plate, G, is secured. This plate is bent downward and inward at its ends, so as to extend a short distance underneath the foot-support A. In each side of the plate G is made a slot, *e*, and through each such slot is placed a plate, H, into a space between the bottom of the recess *d* and the plate G. The plates H H have each a rack, *f*, formed at their front edges, as shown in Fig. 2. Each plate H is curved upward and inward at its outer end, so as to form a hook, G, to catch over the edge *h* of the sole of the boot or shoe. In the recess *d*, directly behind the plate H, there is placed a spring, I, which is formed of a single piece of wire bent backward at its ends, as shown at *i i*, and also bent at its center to form a horizontal projection, as shown at *j*, in Fig. 2. This wire at its ends bears against the back edges of the plates H H, and keeps the racks *f* at the front edges of said plates engaged with the front edges of the slots *e*. The plates H H are thereby retained in proper position or prevented from being forced out laterally from the foot-support. In order to release the plates H H that they may be adjusted to the width of the sole, the ends of the spring I are bent down so as to enter the small vertical notches *k* at the back ends of the slots *e*, as in Fig. 1, and thereby be free from the plates H, so that the latter may be pressed backward in the recess *d*, and the racks *f* be free from the front edges of the slots *e*. This adjustment of the wire I is indicated by red lines in Fig. 1.

This fastening for a skate is very effective and simple, and may be applied at a small cost to almost every variety of skate.

The heel-fastening shown in Figs. 1 and 2 is substantially the same as was patented by me March 4, 1862.

A great number of variations and modifications may be employed without departing from the principle of my invention, and I therefore do not confine myself to the precise arrangement of parts as herein shown and described.

Having thus described my invention, I claim as new and desire to secure by Letters Patent—

1. The hanger B, attached to a rocking foot-support, and vibrating upon inclined rods attached to said support in the manner shown and described, and for the purpose specified.

2. So attaching the rollers or runners to the foot-support of a skate that they will be swung to run the skate in a curved line to the right or left by the rocking motion of the foot-support, as set forth.

3. The combination, with the shaft on which the rollers are placed, of the rocking foot-support A, springs F, hanger B, and inclined rod C, all arranged substantially as set forth, to enable said rollers to take a curve by a slight twist of the foot.

4. The inclined rod C, held at one end by the rigid piece D, and adjustably attached at the other to the foot-support A for the purpose of determining the degree of curvilinear motion, in the manner described.

5. The plates H H, provided with hooks *g* at their front ends and racks *f* at their front edges, in combination with the spring I and plate G, the latter being applied to the foot-support A, and provided with slots *e* at its ends, all arranged to form a fastening for the skate, as set forth.

JAMES L. PLIMPTON.

Witnesses:

GEORGE W. MABEE,

A. V. BIESEN.